United States Patent
Imaeda et al.

(10) Patent No.: US 7,454,421 B2
(45) Date of Patent: Nov. 18, 2008

(54) DATABASE ACCESS CONTROL METHOD, DATABASE ACCESS CONTROLLER, AGENT PROCESSING SERVER, DATABASE ACCESS CONTROL PROGRAM, AND MEDIUM RECORDING THE PROGRAM

(75) Inventors: Takashi Imaeda, Tokyo (JP); Kimitaka Endo, Tokyo (JP); Jouji Nakayama, Tokyo (JP); Tetsuya Yamamoto, Tokyo (JP); Ken-ichiro Shimokura, Tokyo (JP); Tsutomu Yabuuchi, Tokyo (JP); Hirohisa Tezuka, Tokyo (JP); Masato Urano, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 102 days.

(21) Appl. No.: 10/522,552

(22) PCT Filed: Jul. 9, 2004

(86) PCT No.: PCT/JP2004/009847

§ 371 (c)(1),
(2), (4) Date: Aug. 12, 2005

(87) PCT Pub. No.: WO2005/006204

PCT Pub. Date: Jan. 20, 2005

(65) Prior Publication Data

US 2006/0143189 A1    Jun. 29, 2006

(30) Foreign Application Priority Data

Jul. 11, 2003    (JP) .............................. 2003-273602

(51) Int. Cl.
 *G06F 17/30* (2006.01)
(52) U.S. Cl. .............................. 707/9; 707/10; 707/100; 709/228; 709/229; 726/21
(58) Field of Classification Search .................. 707/100
See application file for complete search history.

(56) References Cited

U.S. PATENT DOCUMENTS 6,081,900 A * 6/2000 Subramaniam et al. ....... 726/19

(Continued)

FOREIGN PATENT DOCUMENTS

CA    2 401 348    9/2001

(Continued)

(Continued)

OTHER PUBLICATIONS

Junji Kuroda et al., "Mitsubishi EDI Package 'EDIFOAS/Web'", Mitsubishi Denki Giho, vol. 72, No. 2, pp. 36 to 39, Feb. 25, 1998.
Yutaka Sato, "Tamokuteki Proxy Server Dele Gate no Kino Shosai", Interface, vol. 21, No. 9, pp. 130 to 146, Sep. 1, 1995.

*Primary Examiner*—Khanh B. Pham
*Assistant Examiner*—Andalib F Lodhi
(74) *Attorney, Agent, or Firm*—Oblon, Spivak, McClelland, Maier & Neustadt, P.C.

(57) ABSTRACT

A database access control apparatus generates and stores an access key based on a user ID of a user apparatus. Then, the database access control apparatus sends the access key to the user apparatus with an address of a proxy process server apparatus. The user apparatus sends the access key to the proxy process server apparatus when making a database access request, and the proxy process server apparatus sends the access key to the database access control apparatus when making a database process request. When receiving the database process request, the database access control apparatus determines whether an access key same as the access key received from the proxy process server apparatus is stored in the database access control apparatus, and accesses the database only if having the access key.

15 Claims, 4 Drawing Sheets

U.S. PATENT DOCUMENTS

| | | |
|---|---|---|
| 6,393,472 B1 | 5/2002 | Anerousis et al. |
| 6,606,627 B1 * | 8/2003 | Guthrie et al. ............... 707/10 |
| 7,058,971 B1 * | 6/2006 | Horikiri ..................... 726/7 |
| 2002/0029207 A1 | 3/2002 | Bakalash et al. |
| 2002/0099691 A1 | 7/2002 | Lore et al. |
| 2002/0116364 A1 | 8/2002 | Seki et al. |
| 2002/0184187 A1 | 12/2002 | Bakalash et al. |
| 2003/0129032 A1 | 7/2003 | Hyatt et al. |
| 2003/0217079 A1 | 11/2003 | Bakalash et al. |
| 2003/0225766 A1 * | 12/2003 | Furumoto ..................... 707/9 |
| 2005/0071421 A1 * | 3/2005 | Calo et al. ................. 709/203 |

FOREIGN PATENT DOCUMENTS

| | | |
|---|---|---|
| CN | 1159234 A | 9/1997 |
| CN | 1387140 A | 12/2002 |
| JP | 8-235116 | 9/1996 |
| JP | 10-303947 | 11/1998 |
| JP | 11-212911 | 8/1999 |
| JP | 2000-181980 | 6/2000 |
| JP | 2000-330957 | 11/2000 |
| JP | 2001-101054 | 4/2001 |
| JP | 2001-265747 | 9/2001 |
| JP | 2001-273258 | 10/2001 |
| JP | 2002-163235 | 6/2002 |
| JP | 2002-183094 | 6/2002 |
| WO | WO 97/15008 | 4/1997 |
| WO | 02/19229 | 3/2002 |

* cited by examiner

DATABASE ACCESS CONTROL METHOD, DATABASE ACCESS CONTROLLER, AGENT PROCESSING SERVER, DATABASE ACCESS CONTROL PROGRAM, AND MEDIUM RECORDING THE PROGRAM

TECHNICAL FIELD

The present invention relates to an access control technology for databases. More particularly, the present invention relates to a database access control technology for accessing a database through cooperation between a database access control apparatus and a proxy process server apparatus as a proxy of a user.

BACKGROUND ART

Generally, since a database stores data of plural users, an access control mechanism of the database controls which user can register, refer to, update or delete which piece of data. In the following, registration, reference, update and delete are collectively referred to as "access to a database". For example, in the access control mechanism, access control is performed such that a user B cannot access data of a user A and the user A cannot access data of the user B.

As an access control method of the database, there is a previously known method in which a user who tries to access data is identified by comparing authentication information such as a pair of a user ID and a password that are passed to the database by the user with authentication information registered beforehand in the access control mechanism of the database, and next, whether to give permission to access each piece of data is determined based on an access control list in which accessible data are set for the identified user.

This is a method that is used in many existing databases. In SQL 92 that is a standard language for accessing databases, a grant sentence and a revoke sentence are defined for adding and deleting access authority information in the access control list so as to add or cancel access authority to data for a user.

The above-mentioned access control method is applied to a case in which only users who store data in the database access the database. On the other hand, as an example different from that, there is a method in which a proxy agent (a proxy process server) instead of a user who stores data in the database accesses the database. This method is performed by the user requesting the proxy agent to access the database. This method is performed in a case, for example, where the proxy agent provides a function for processing data, and the user has the proxy agent process data stored in the database so that the user receives a process result.

A matter that should be considered when the proxy agent as a proxy of the user accesses the database is that the proxy agent should access the database based on access authority of the user who is a client. For example, when a user A requests a proxy agent to access a database, access control should be performed such that the proxy agent can only access data which the user A is permitted to access. That is, there should not be a case where, in spite of a request by the user A, the proxy agent accesses data of the user B that are not permitted to be accessed by the user A and returns the data to the user A. An event in which a proxy agent accesses a database based on access authority of a client user is called a transfer of access authority from the user to the proxy agent.

As the simplest one of the access control methods that satisfies the above-mentioned condition, there is a method in which a user passes own authentication information such as a user ID and a password to a proxy agent for accessing a database so that the proxy agent accesses the database with the authentication information to obtain data of the user.

Another method uses digital signature technology and encrypted communication technology for determining whether a transfer of access authority to the proxy agent by the user is valid by using a digital certificate, a digital signature, encryption and a unidirectional function (for example, refer to document 1: Japanese Laid-Open Patent Application No. 2001-101054; document 2: Japanese Laid-Open Patent Application No. 2002-163235).

However, there is the following problem in the method in which the user passes the own authentication information to a proxy agent and the proxy agent accesses a database by using the authentication information. Generally, the proxy agent is an entity of a third party different from the user; thus, the user cannot necessarily trust the proxy agent. Therefore, for example, if a user A passes authentication information such as a user ID and a password to the proxy agent, there is a possibility that the proxy agent will perform a malicious process in which the proxy agent holds the authentication information in its inside, so that the proxy agent disguises itself as the user A by using the held authentication information when a user B, which is another user, accesses the database so as to allow the user B to access the data of the user A that the user B is not permitted to access.

In addition, in the method for determining the transfer of the access authority and the like by using digital signature technology and encryption communication technology, it is necessary to perform complicated processes such as producing the digital certificate, producing the digital signature, encryption and the unidirectional function. In addition, it is necessary to perform several steps of exchanging key information and authentication information and the like between the user, the proxy agent and the database. In addition, these methods are used only for a system for transferring access authority, and even though the method is used, it is not ensured that a result of accessing the database based on the transferred access authority is returned with reliability to the user who has transferred the access authority. Therefore, this method is not appropriate for applying to the proxy agent that the user requests to access a database.

DISCLOSURE OF THE INVENTION

Problem to be Solved by the Invention

The present invention is contrived to solve the above-mentioned problem, and an object of the present invention is to provide a mechanism for preventing a proxy agent (a proxy process server) from performing an unauthorized access to a database or to a function corresponding to a database.

Means for Solving the Problem

In the present invention, a database access control apparatus sends an address of a usable proxy process server apparatus to a user apparatus in response to a request from the user apparatus. The user apparatus connects to the proxy process server apparatus of the address to make a database access request, and the proxy process server apparatus makes the database process request to the database access control apparatus according to the database access request from the user apparatus. The database access control apparatus performs a process on a database in response to the database process request from the proxy process server apparatus, and sends the process result to the proxy process sever apparatus. The proxy process server apparatus performs a requested process on the process result sent from the database access control apparatus, and sends a process result to the user apparatus.

In addition, in the present invention, the database access control apparatus generates an access key based on a user ID of the user apparatus, stores the access key in a storing part of the database access control apparatus and sends the access key to the user apparatus. The user apparatus sends the access key to the proxy process server apparatus when making the database access request to the proxy process server apparatus, and the proxy process server apparatus sends the access key to the database access control apparatus when making the database process request of the database access control apparatus. The database access control apparatus determines whether an access key the same as the access key received from the proxy process server apparatus exists in the storing part, and executes an access to data in the database within a limit permitted for the user ID corresponding to the access key only if the access key exists in the storing part.

In addition, in the present invention, the database access control apparatus determines whether the user apparatus is in a state of connecting to the proxy process server apparatus in addition to performing determination of the access key, and performs the access to the data in the database only if the user apparatus is in a state of connecting to the proxy process server apparatus.

In the above-mentioned configurations, the database process request means a request for a process such as data registration, change, delete or search to a database.

EFFECT OF THE INVENTION

According to the present invention, a proxy process server apparatus that is not provided with a proxy process permission cannot execute a database access process, and even a proxy process server apparatus that is provided with a proxy process permission cannot perform a process such as data registration, change, delete or search on a database exceeding the authority of the user ID that requested a proxy process.

In addition, the proxy process server apparatus is prevented from performing a database search process by itself without receiving a search proxy process request from a user apparatus. Therefore, a user of the proxy process server apparatus can use the proxy process server apparatus for performing a process for searching a database and processing the search result, without worrying about invalid acts being performed. Accordingly, the user can use various proxy process server apparatuses that perform useful processes provided by third parties.

DESCRIPTION OF SYMBOLS 100 data base access control apparatus
101 mediation process part
102 access process part
200 database
210 user data part
220 user system data part
230 stored data part
300 proxy process server apparatus
400 user apparatus
500 network

PREFERRED EMBODIMENTS FOR CARRYING OUT THE INVENTION

In the following, embodiments of the present invention are described with reference to figures in more detail.

Embodiment 1

Figure 1:
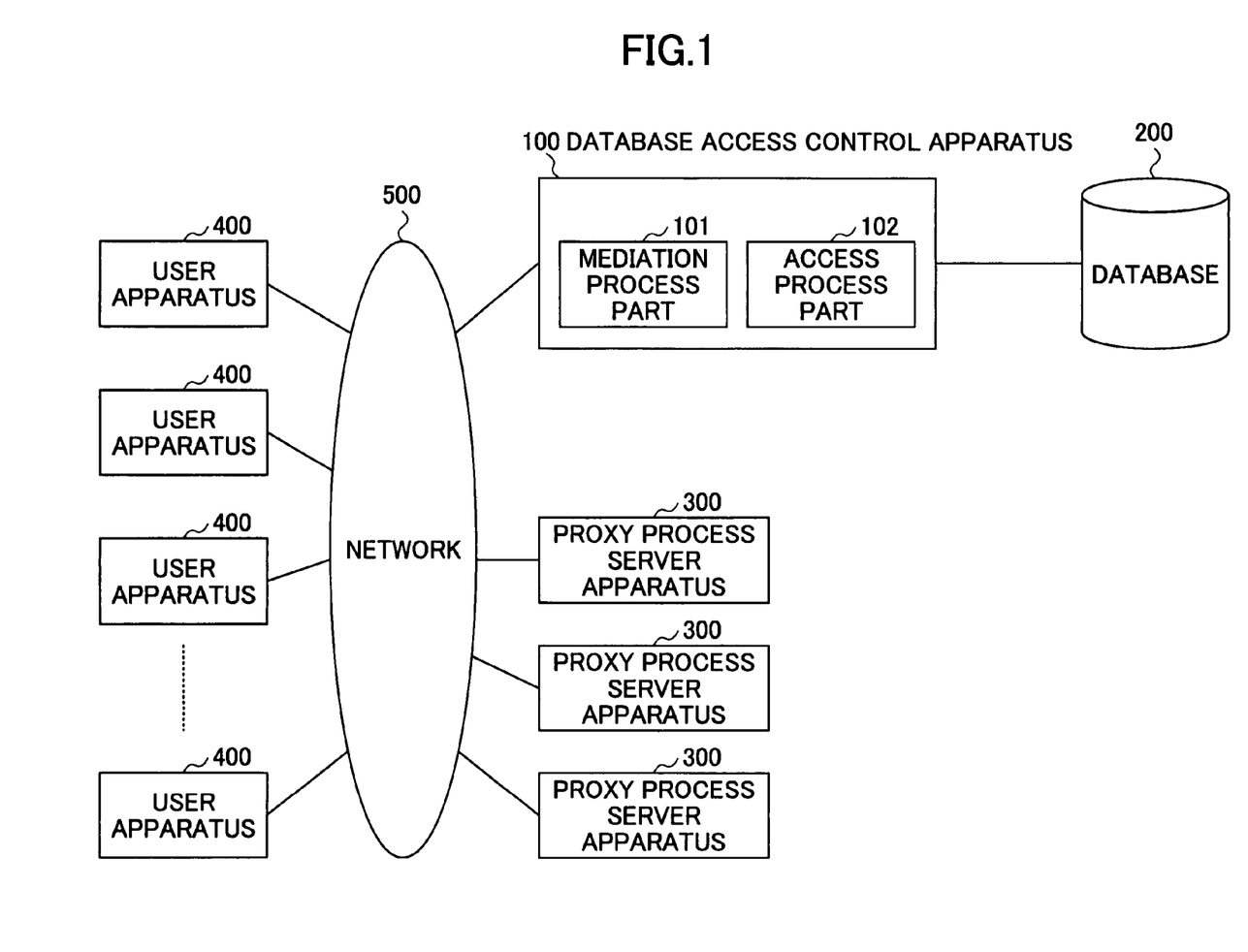
FIG. 1 is a block diagram of a whole system to which the present invention is applied.

FIG. 1 shows a block diagram of a whole system to which the present invention is applied. In FIG. 1, 100 indicates a database access control apparatus, 200 indicates a database shared by plural users, 300 indicates a proxy process server apparatus, 400 indicates user apparatuses of each user, and 500 indicates a network such as the Internet. The database access control apparatus 100 includes a mediation process part 101 having a mediation function between the user apparatus 400 and the proxy process server apparatus 300, and an access process part 102 having an access function to access stored data of the database 200.

The database 200 holds beforehand information on users such as registered user IDs and authentication information, information on the proxy process server apparatuses 300 and stored data that the system provides. In addition, although not shown in FIG. 1, the database 200 includes an access control mechanism in the inside. The database access control apparatus 100 and the database 200 may be connected directly or via a network.

In the following, a case for obtaining a search result of data from the database apparatus via the proxy process server apparatus is described. Other than data search that is described in the following, the present invention can be applied to various processes such as data registration, update, delete, search and the like.

The database access control apparatus 100, the proxy process server apparatus 300 and the user apparatus 400 are connected via the network 500. The actual entity of each of the database access control apparatus 100 and the proxy process server apparatus 300 is a computer that performs each process by a program under an environment of hardware resources such as a CPU, a memory and the like. In this embodiment, the database access control apparatus 100 and the proxy process server apparatus 300 operate in cooperation with each other as a proxy of a user so that access to the database 200 is performed, a desired process is performed on read stored data, and the result is sent to a user apparatus 400 of the user.

Figure 2:
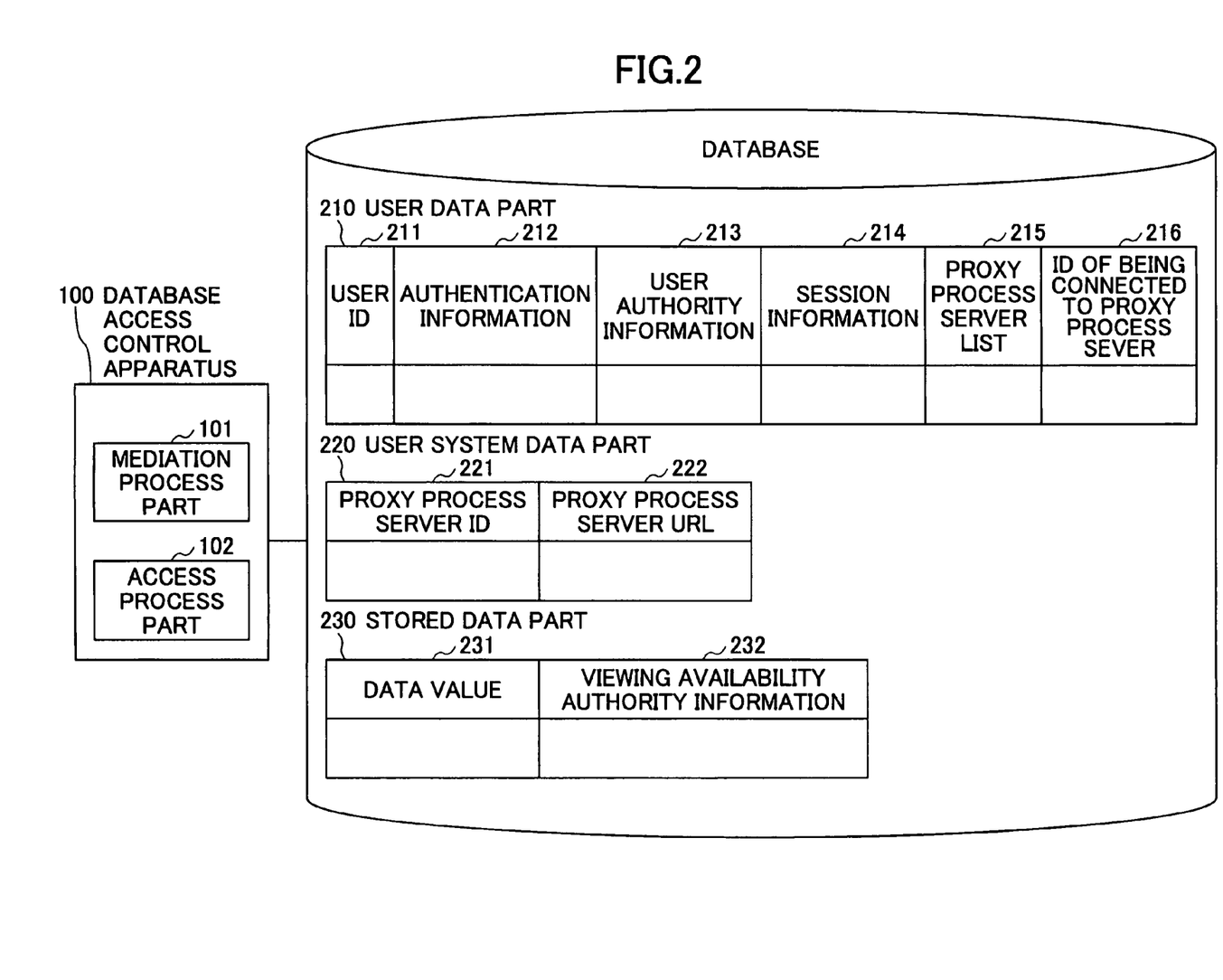
FIG. 2 is a schematic diagram showing an example of stored data in a database.

FIG. 2 is an example of stored data in the database 200. The database 200 includes a user data part 210, a user system data part 220, and a stored data part 230. The user data part 210 is for storing information on registered users. The user data part 210 stores, for each user, a user ID 211, authentication information 212, user authority information 213, session information 214, a proxy server list 215, and an ID of each connecting proxy process sever 216. The user system data part 220 is for storing information of a system that acts as a proxy of a user. In this embodiment, the user system data part 220 stores an ID (proxy process server ID) 221 of the proxy process server apparatus 300, and the URL (proxy process server URL) 222. The stored data part 230 stores data 231 and viewing availability authority information 232 of the data.

Figure 3:
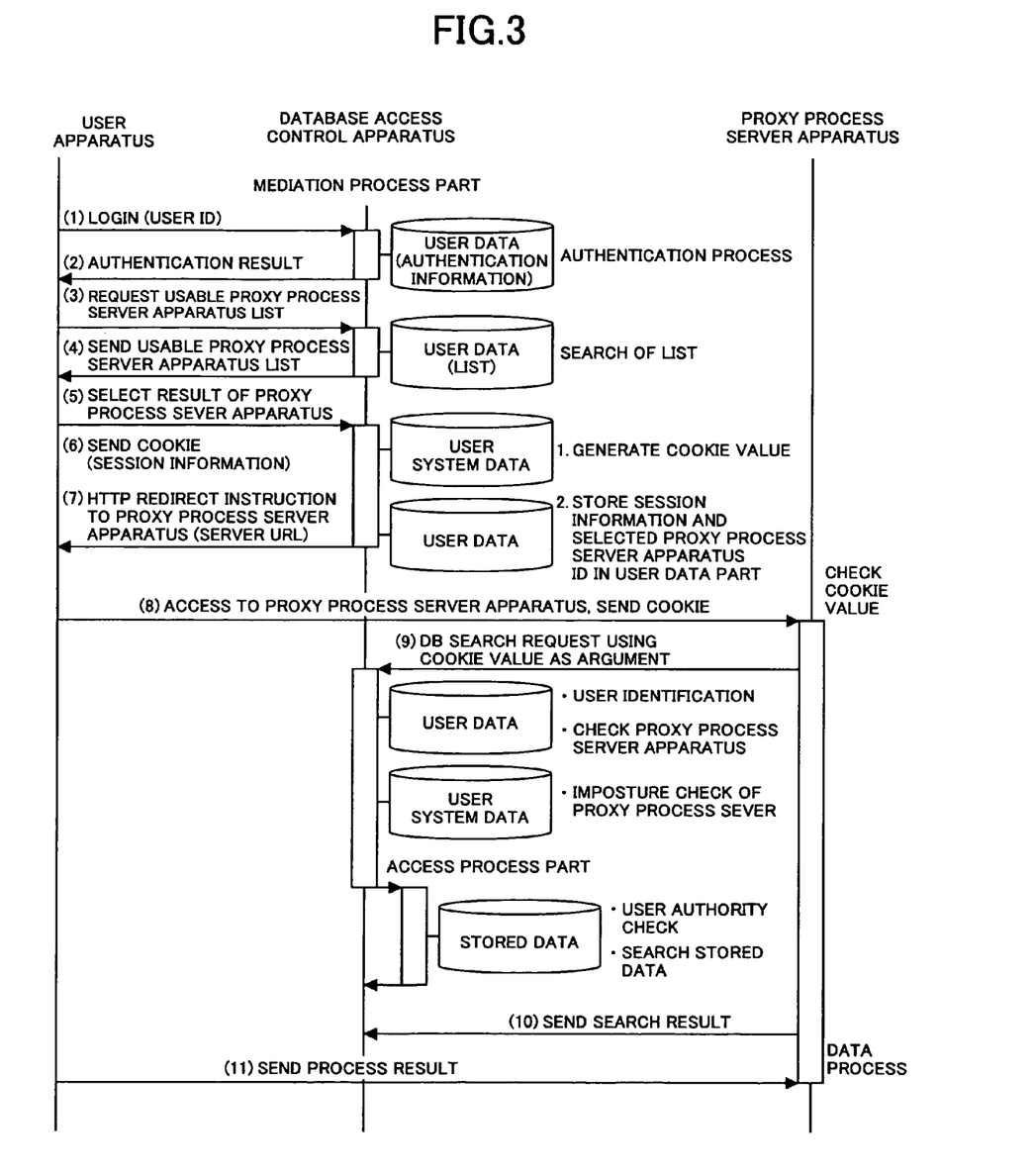
FIG. 3 is a sequence diagram of a process sequence of an embodiment of the present invention.
Figure 4:
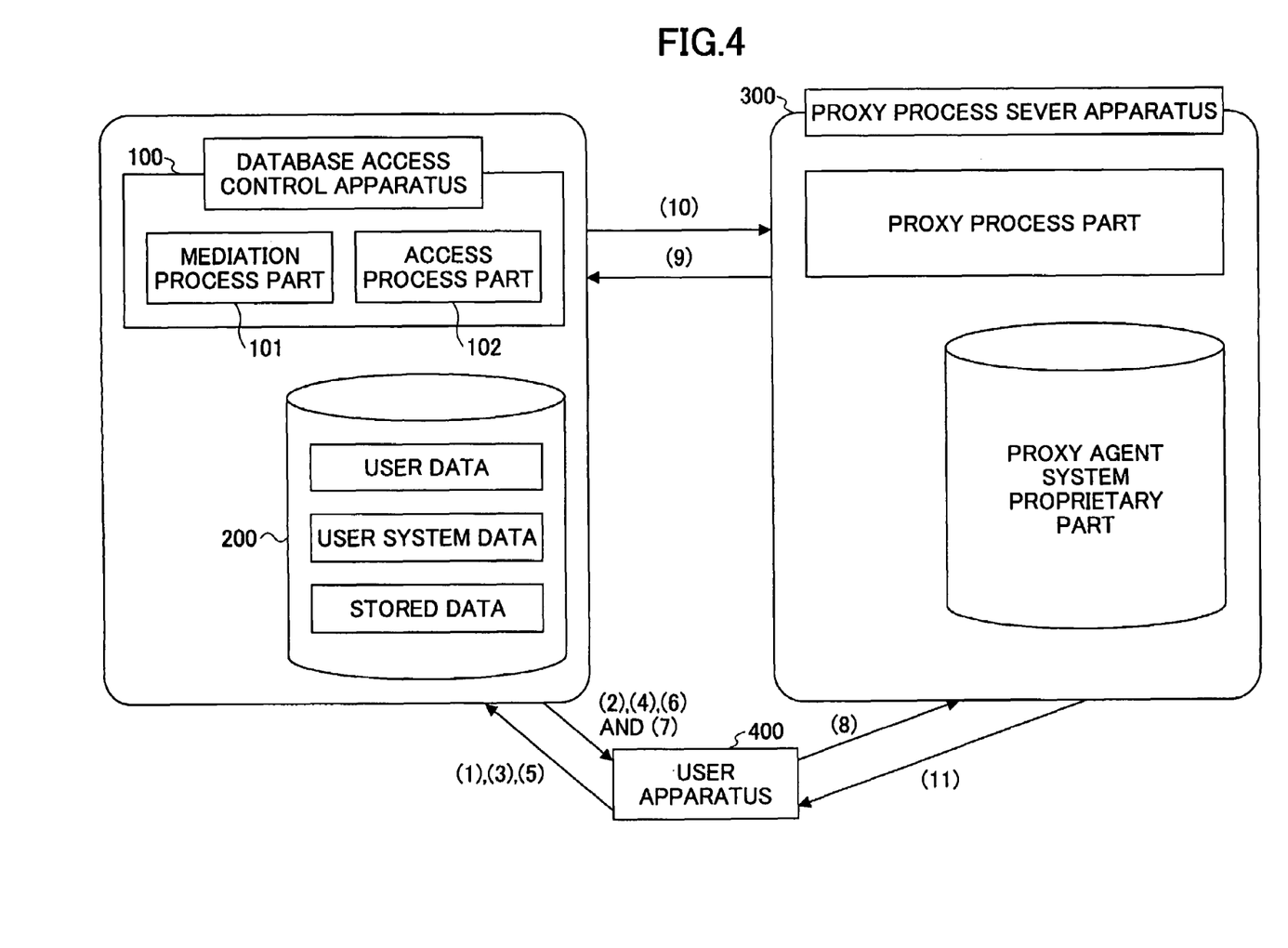
FIG. 4 is a schematic diagram for showing liaison between apparatuses in an embodiment of the present invention.

FIG. 3 shows a sequence example of whole processes of the present embodiment. In addition, FIG. 4 shows liaison between apparatuses. By referring to FIGS. 3 and 4, in the following, an example is described in which HTTP is used as a protocol for connecting three parties that are the user apparatus 400, the database access control apparatus 100 and the proxy process server apparatus 300.

First, from a user apparatus 400, a user logs in to the database access control apparatus 100 by using a user ID 211 stored in the user data part 210 of the database 200 beforehand (step 1). At this time, the mediation process part 101 of the database access control apparatus 100 performs an authentication process by using the authentication information of each user 212 stored in the user data part 210 of the same database 200. Accordingly, the mediation process part 101 of the database access control apparatus 100 determines whether the user who tries to log in is a valid user who has registered beforehand, and sends an authentication result to the user apparatus 400 (step 2).

Next, the user apparatus 400 sends a command to the database access control apparatus 100 for requesting a list of proxy process server apparatuses that the user can use (step 3). The mediation process part 101 of the database access control apparatus 100 that receives the command reads the list 215 of the proxy process sever apparatuses 300 that the user can use from the user data part 210 of the database 200, and sends the list to the user apparatus 400 (step 4). The user apparatus 400 displays the received proxy process sever list on a screen. When a proxy process server apparatus 300 to be used is selected by the user from among the usable proxy process servers that are displayed, the user apparatus 400 sends the result to the database access control apparatus 100 (step 5). The user apparatus 400 also sends information necessary for processes (database access and the like) in the proxy process server 300 on the basis of the input by the user in step 5.

When the mediation process part 101 of the database access control apparatus 100 receives information of the selected proxy process server apparatus 300 from the user apparatus 400, the mediation process part 101 searches the list 215 of proxy process server apparatuses 300 that can be used by the user in the user data 210 of the database 200 so as to determine whether use of the selected proxy process server apparatus 300 by the user is permitted. After that, the mediation process part 101 generates a random number (session information) based on the user ID, generates a Cookie (access key) from the generated session information and sends it to the user apparatus 400 of the user (step 6), obtains a URL 222 of the selected proxy process server apparatus 300 from the user system data part 220 of the database 200, and sends the URL 222 to the user apparatus, so as to instruct the user apparatus 400 to perform a redirect connection to the proxy process server apparatus by a HTTP redirect response (step 7). In addition, the mediation process part 101 stores the generated session information and an ID number 216 of the proxy process server apparatus 300 to be connected in the user data part 210 of the database 200.

When the user apparatus 400 performs the redirect connection to the proxy process server apparatus 300, the user apparatus 400 sends a value of the Cookie received from the database access control apparatus 100 to the proxy process server apparatus 300 (step 8).

The proxy process server apparatus 300 extracts the value of the Cookie included in a connection request that is a HTTP request from the user apparatus 400. Then, the proxy process server apparatus 300 sends a HTTP request (database search request) to the database access control apparatus 100 by using a value for designating a table of stored data necessary for performing processes directed by the user and a value used for search as arguments of the HTTP request (step 9). In addition, with the database search request, an ID of the proxy process server apparatus 300 is sent to the database access control apparatus 100.

The mediation process part 101 of the database access control apparatus 100 that receives the HTTP request (database search request) from the proxy process server apparatus 300 first extracts the arguments set in the request. Then, the mediation process part 101 extracts session information in the value of the Cookie in the augments, and identifies a user ID of the user apparatus 400 that has originated the HTTP request to the proxy process server apparatus 300 by comparing the extracted session information and session information 214 in the user data part 210 of the database 200 (user identification). When the user ID exists, the mediation process part 101 obtains an ID number of the proxy process server apparatus 300 received from the proxy process server apparatus 300, and compares an ID number 216 of the connecting proxy process server apparatus 300 corresponding to the user ID in the user data part 210 of the database 200 with the above-mentioned ID number to determine whether they are the same (proxy process server checking). When they are the same, it is determined whether the ID of the proxy process server apparatus 300 exists in the user system data part 220 (imposture check for proxy process server). Further, a process may be performed for checking whether the user of the user ID has permission to use the proxy process server apparatus 300 by using the proxy process server list 215.

If the user ID corresponding to the session information does not exist, or if the received ID number of the proxy process server apparatus 300 is not the same as the ID number recorded as a connecting proxy process server ID, or if the ID of the proxy process server apparatus 300 does not exist in the user system data part 220, the mediation process part 101 of the database access control apparatus 100 sends an error response to the proxy process server apparatus 300, and does not perform any process after that.

If the user ID exists, ID numbers of the proxy process server apparatus are the same and the ID of the proxy process server apparatus 300 exists in the user system data part 220, the mediation process part 101 passes remaining argument information included in the HTTP request to the access process part 102 for accessing the stored data part 230 of the database 200.

According to the arguments passed from the mediation process part 101, the access process part 102 of the database access control apparatus 100 executes a search for the stored data 230 of the database 200. At this time, in a case where viewing authority information 232 is set for each user ID in the stored data 230, the search can be performed only if user authority information 213 set for the user ID in the user data part of the database 200 agrees with viewing availability authority information 232 of the stored data 230 (user authority check). A result obtained by searching by the access process part 102 is passed to the mediation process part 101, and the mediation process part 101 sends the result to the proxy process server apparatus 300 as a HTTP response for the HTTP request from the proxy process server apparatus 300 (step 10).

The HTTP request and the response between the proxy process server apparatus 300 and the database access control apparatus 100 can be performed plural times corresponding to searches of the stored data necessary for processes of the proxy process server apparatus 300.

The proxy process server apparatus 300 performs necessary data processes (a process for performing data mining, a process in combination with related data stored in a database included in the proxy process server apparatus itself and the like) on stored data included in the HTTP response received from the mediation process part 101 of the database access control apparatus 100, and sends the result to the user apparatus 400 in the form of a HTTP response (step 11).

In the above-mentioned operations, one proxy process server apparatus 300 is selected from the list of the proxy process server apparatuses 300 received from the database access control apparatus 100 by the user apparatus 400, and the selected result is sent to the database access control apparatus 100. Then, the mediation process part 101 of the database access control apparatus 100 records the ID number of the selected proxy process server apparatus 300 as the ID number 216 of a connecting proxy process server apparatus 300 in the user data part 210 of the database 200. After that, in order to connect to another proxy process server apparatus 300, when the user apparatus 400 performs list display of the proxy process server apparatuses 300 again or performs an operation for another service provided by the database access control apparatus 100, the previous ID number (216) of the proxy process server apparatus 300 stored in the user data part 210 of the database 200 is deleted or rewritten. In addition, a different value is generated as the session information each time when login by the user ID is performed.

Therefore, even if the proxy process server apparatus 300 stores a value of the Cookie from the once connected user apparatus 400 and tries to connect to the database access control apparatus 100 without receiving a request from the user apparatus 400, since the mediation process part 101 of the database access control apparatus 100 cannot identify a user based on the session information included in the value of the Cookie, a search process requested by the proxy process server apparatus 300 is not performed. Further, when the proxy process server apparatus 300 connects to the database access control apparatus 100 by itself without receiving a request from the user apparatus 400, the mediation process part 101 of the database access control apparatus 100 does not perform a search process requested by the proxy process server apparatus 300 since the ID number of the proxy process server apparatus 300 is not recorded in the user data part 210 of the database 200 as the ID number 216 of a connecting proxy process server apparatus 300.

In addition, even if the user apparatus tries to connect to a database by directly designating a URL other than proxy process server apparatuses 300 included in the list received from the database access control apparatus 100 and by using a Cookie generated for another proxy process server apparatus, the mediation process part 101 of the database access control apparatus 100 does not execute a search process requested by the proxy process server apparatus 300 since the ID of the proxy process server is not recorded in the user data part of the database access control apparatus 100 as a connecting proxy process server 216. Accordingly, the user apparatus 400 can be prevented from using a proxy process server apparatus other than the proxy process server apparatuses 300 displayed as on the list.

A part or the whole of process functions of the database access control apparatus 100 shown in FIG. 1 can be formed by a program of a computer, so that the present invention can be realized by executing the program on the computer. Or, the process sequence procedure shown in FIG. 2 can be formed by a program of a computer, and the program can be executed by a computer. In addition, the program for realizing the process functions in the computer or the program that causes the computer to execute the process procedure can be stored and provided in a computer readable recording medium, such as, for example, a FD, a MO, a ROM, a memory card, a CD, a DVD, and a removable disk. In addition, the program can be distributed via a network such as the Internet.

The present invention is not limited to the specifically disclosed embodiments, and variations and modifications may be made without departing from the scope of the claims.

The invention claimed is:

1. A database access control method for performing access control on a database in response to a request from a user apparatus through cooperation between a database access control apparatus and a proxy process server apparatus, comprising:

sending, in the database access control apparatus, an address of a usable proxy process server apparatus to the user apparatus in response to the request from the user apparatus;

connecting the user apparatus to the proxy process server apparatus of the address to make a database access request;

making, in the proxy process server apparatus, a database process request to the database access control apparatus according to the database access request from the user apparatus;

performing, in the database access control apparatus, a process on the database in response to the database process request from the proxy process server apparatus, and sending a process result to the proxy process server apparatus; and performing, in the proxy process server apparatus, an additional process on the process result sent from the database access control apparatus, and sending an additional process result to the user apparatus;

generating, in the database access control apparatus when sending the address of the proxy process server apparatus to the user apparatus, an access key based on a user ID of the user apparatus, storing the access key and a server ID of the proxy process server apparatus in a storing part of the database access control apparatus associating the access key with the server ID and sending the access key and the address to the user apparatus;

sending, in the user apparatus, the access key to the proxy process server apparatus when making the database access request to the proxy process server apparatus;

sending, in the proxy process server apparatus, the access key and the server ID of the proxy process server apparatus to the database access control apparatus when making the database process request to the database access control apparatus; and determining, in the database access control apparatus, whether an access key the same as the access key received from the proxy process server apparatus exists in the storing part, if the access key exists in the storing part, determining whether an ID, associated with the access key, that is the same as the server ID received from the proxy process server apparatus exists in the storing part, and executing an access to data in the database within a limit permitted for the user ID corresponding to the access key only if the server ID exists in the storing part.

2. The database access control method as claimed in claim 1, further comprising:

overwriting or erasing, in the database access control apparatus, the access key stored in the storing part after performing the process on the database in response to the database process request from the proxy server apparatus.

3. The database access control method as claimed in claim 1, further comprising:
overwriting or erasing, in the database access control apparatus, the access key stored in the storing part when the database access control apparatus is accessed by the user apparatus next.

4. The database access control method as claimed in claim 1, further comprising:
overwriting or erasing, in the database access control apparatus, the access key stored in the storing part when the database access control apparatus receives a next request from the user apparatus.

5. A database access control apparatus for performing access control on a database in response to a request from a user apparatus through cooperation with a proxy process server apparatus, comprising:
means for instructing the user apparatus to connect to the proxy process server apparatus by sending an address of a usable proxy process server apparatus to the user apparatus in response to a request from the user apparatus;
means for performing a process on the database in response to a database process request from the proxy process server apparatus, and sending a process result to the proxy process server apparatus;
means for generating an access key based on a user ID of the user apparatus, storing the access key and a server ID of the proxy process server apparatus in a storing part of the database access control apparatus associating the access key with the server ID and sending the access key and the address to the user apparatus when sending the address of the proxy process server apparatus to the user apparatus;
means for receiving the access key and the database process request from the proxy process server apparatus, and determining whether an access key the same as the access key received from the proxy process server apparatus exists in the storing part, if the access key exists in the storing part, determining whether an ID, associated with the access key, that is the same as the server ID received from the proxy process server apparatus exists in the storing part; and
means for executing an access to data in the database within a limit permitted for the user ID corresponding to the access key only if the server ID exists in the storing part.

6. The database access control apparatus as claimed in claim 5, wherein,
the database access control apparatus determines whether the user apparatus is in a state of being connected to the proxy process server apparatus in addition to performing determination of the access key, and performs the access to the data in the database only if the user apparatus is in the state of being connected to the proxy process server apparatus.

7. The database access control apparatus as claimed in claim 5, further comprising:
means for overwriting or erasing the access key stored in the storing part of the database access control apparatus after the database access control apparatus performs the process on the database in response to the database process request from the proxy server apparatus.

8. The database access control apparatus as claimed in claim 5, further comprising:
means for overwriting or erasing the access key stored in the storing part of the database access control apparatus when the database access control apparatus is accessed by the user apparatus next.

9. The database access control apparatus as claimed in claim 5, further comprising:
means for overwriting or erasing the access key stored in the storing part of the database access control apparatus when the database access control apparatus receives a next request from the user apparatus.

10. A computer readable storage medium encoded with a program for causing a computer to execute a database access control process for performing access control on a database in response to a request from a user apparatus through cooperation with a proxy process server apparatus, the program causing the computer to execute a step comprising:
instructing the user apparatus to connect to the proxy process server apparatus by sending an address of a usable proxy process server apparatus to the user apparatus in response to a request from the user apparatus;
performing a process on the database in response to a database process request from the proxy process server apparatus, and sending a process result to the proxy process server apparatus;
generating an access key based on a user ID of the user apparatus, storing the access key and a server ID of the proxy process server apparatus in a storing part of the database access control apparatus associating the access key with the server ID and sending the access key and the address to the user apparatus when sending the address of the proxy process server apparatus to the user apparatus;
receiving the access key and the database process request from the proxy process server apparatus, and determining whether an access key the same as the access key received from the proxy process server apparatus exists in the storing part, if the access key exists in the storing part, determining whether an ID, associated with the access key, that is the same as the server ID received from the proxy process server apparatus exists in the storing part; and
executing an access to data in the database within a limit permitted for the user ID corresponding to the access key only if the server ID exists in the storing part.

11. The computer readable storage medium as claimed in claim 10, the program causing the computer to execute a step comprising:
determining whether the user apparatus is in a state of being connected to the proxy process server apparatus in addition to performing determination of the access key, and performing the access to the data in the database only if the user apparatus is in the state of being connected to the proxy process server apparatus.

12. The computer readable storage medium as claimed in claim 10, the program causing the computer to further execute a step comprising:
overwriting or erasing the access key stored in the storing part of the database access control apparatus after the database access control apparatus performs the process on the database in response to the database process request from the proxy server apparatus.

13. The computer readable storage medium as claimed in claim 10, the program causing the computer to further execute a step comprising:

overwriting or erasing the access key stored in the storing part of the database access control apparatus when the database access control apparatus is accessed by the user apparatus next.

14. The computer readable storage medium as claimed in claim 10, the program causing the computer to further execute a step comprising:

overwriting or erasing the access key stored in the storing part of the database access control apparatus when the database access control apparatus receives a next request from the user apparatus.

15. A system, comprising:

a database access control apparatus configured to send an address of a usable proxy process server apparatus to a user apparatus in response to a request from the user apparatus;

the user apparatus is configured to connect to the proxy process server apparatus of the address to make a database access request;

the proxy process server apparatus is configured to make a database process request to the database access control apparatus according to the database access request from the user apparatus;

the database access control apparatus is configured to perform a process on the database in response to the database process request from the proxy process server apparatus, and is configured to send a process result to the proxy process server apparatus; and the proxy process server apparatus is configured to perform an additional process on the process result sent from the database access control apparatus, and is configured to send an additional process result to the user apparatus, wherein the database access control apparatus is configured to generate an access key based on a user ID of the user apparatus, to store the access key and a server ID of the proxy process server apparatus in a storing part of the database access control apparatus associating the access key with the server ID and to send the access key and the address to the user apparatus, the user apparatus is configured to send the access key to the proxy process server apparatus when making the database access request to the proxy process server apparatus, the proxy process server apparatus is configured to send the access key and the server ID of proxy process server apparatus to the database access control apparatus when making the database process request to the database access control apparatus, and the database access control apparatus is configured to determine whether an access key the same as the access key received from the proxy process server apparatus exists in the storing part, if the access key exists in the storing part, determining whether an ID, associated with the access key, that is the same as the server ID received from the proxy process server apparatus exists in the storing part, and to execute an access to data in the database within a limit permitted for the user ID corresponding to the access key only if the server ID exists in the storing part.

* * * * *